(12) United States Patent
Schukalski

(10) Patent No.: US 12,059,989 B2
(45) Date of Patent: Aug. 13, 2024

(54) HEADREST WITH AN ADJUSTMENT DEVICE

(71) Applicant: Brose Fahrzeugteile SE & Co. Kommanditgesellschaft, Coburg, Coburg (DE)

(72) Inventor: Jürgen Schukalski, Küps (DE)

(73) Assignee: Brose Fahrzeugteile SE & Co. Kommanditgesellschaft, Coburg (DE)

( * ) Notice: Subject to any disclaimer, the term of this patent is extended or adjusted under 35 U.S.C. 154(b) by 80 days.

(21) Appl. No.: 17/910,573

(22) PCT Filed: Oct. 12, 2020

(86) PCT No.: PCT/EP2020/078586
§ 371 (c)(1),
(2) Date: Sep. 9, 2022

(87) PCT Pub. No.: WO2021/180344
PCT Pub. Date: Sep. 16, 2021

(65) Prior Publication Data
US 2023/0137430 A1 May 4, 2023

(30) Foreign Application Priority Data
Mar. 11, 2020 (DE) ...................... 10 2020 203 159.2

(51) Int. Cl.
*B60N 2/865* (2018.01)
*B60N 2/829* (2018.01)

(52) U.S. Cl.
CPC ............. *B60N 2/865* (2018.02); *B60N 2/829* (2018.02)

(58) Field of Classification Search
CPC ................................ B60N 2/865; B60N 2/829
See application file for complete search history.

(56) References Cited

U.S. PATENT DOCUMENTS

| | | | |
|---|---|---|---|
| 7,770,967 B2 * | 8/2010 | Hirota | B60N 2/862 297/216.12 |
| 7,878,597 B2 * | 2/2011 | Bokelmann | B60N 2/829 297/410 |
| 8,616,633 B2 * | 12/2013 | Truckenbrodt | B60N 2/865 297/216.12 |
| 8,899,685 B2 * | 12/2014 | Haeske | B60N 2/42727 297/410 |
| 9,278,635 B2 * | 3/2016 | Humer | B60N 2/85 |

(Continued)

FOREIGN PATENT DOCUMENTS

| | | |
|---|---|---|
| DE | 10039992 A1 | 2/2002 |
| DE | 102004034624 B3 | 3/2006 |

(Continued)

*Primary Examiner* — Philip F Gabler
(74) *Attorney, Agent, or Firm* — Dickinson Wright PLLC

(57) ABSTRACT

A headrest for a vehicle seat, comprises an adjustment device comprising at least two adjusting parts and a drive element movable along an axis, wherein the drive element is coupled to the adjusting parts via engaging drive contours which are defined for each of the adjusting parts describe at least one adjustment path, the adjustment path of at least one of the adjusting parts having a twist with respect to the axis and extending from the adjustment path of at least one other of the adjusting parts so that an axial movement of the driving member along the axis causes a relative rotation between the adjusting parts.

30 Claims, 14 Drawing Sheets

(56) References Cited

U.S. PATENT DOCUMENTS

| | | | |
|---|---|---|---|
| 9,365,140 B2* | 6/2016 | Falster | B60N 2/885 |
| 10,160,361 B2* | 12/2018 | Little | B60N 2/02246 |
| 10,427,573 B2* | 10/2019 | Ishihara | B60N 2/829 |
| 10,500,997 B2* | 12/2019 | Maloney | B60N 2/829 |
| 10,562,425 B2* | 2/2020 | Jarrin | B60N 2/844 |
| 2016/0325652 A1 | 11/2016 | Ishihara et al. | |
| 2019/0315256 A1 | 10/2019 | Maloney et al. | |

FOREIGN PATENT DOCUMENTS

| | | |
|---|---|---|
| DE | 102006004968 A1 | 10/2006 |
| DE | 202012102149 U1 | 10/2012 |
| DE | 202012102150 U1 | 10/2012 |
| DE | 202012102152 U1 | 10/2012 |
| DE | 202012102153 U1 | 10/2012 |
| DE | 202012102154 U1 | 10/2012 |
| DE | 202013102086 U1 | 6/2013 |
| DE | 102012105074 A1 | 12/2013 |
| DE | 102012105078 A1 | 12/2013 |
| DE | 102012113178 A1 | 7/2014 |
| DE | 102013101390 A1 | 7/2014 |
| DE | 102013100829 A1 | 8/2014 |
| DE | 102013104912 A1 | 11/2014 |
| EP | 1661753 A2 | 5/2006 |
| EP | 2631116 A2 | 8/2013 |
| EP | 2675044 A2 | 12/2013 |
| EP | 2675045 A2 | 12/2013 |
| EP | 2675046 A2 | 12/2013 |
| EP | 2604471 B1 | 1/2015 |
| EP | 2767730 B1 | 4/2016 |
| WO | 2011063874 A1 | 6/2011 |

\* cited by examiner

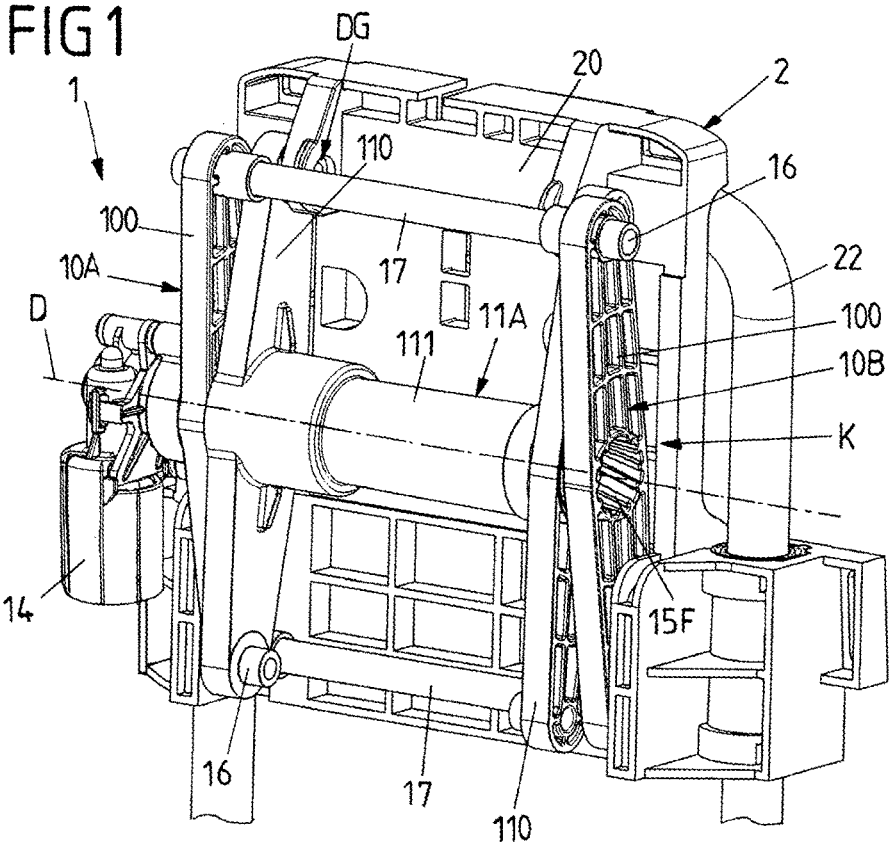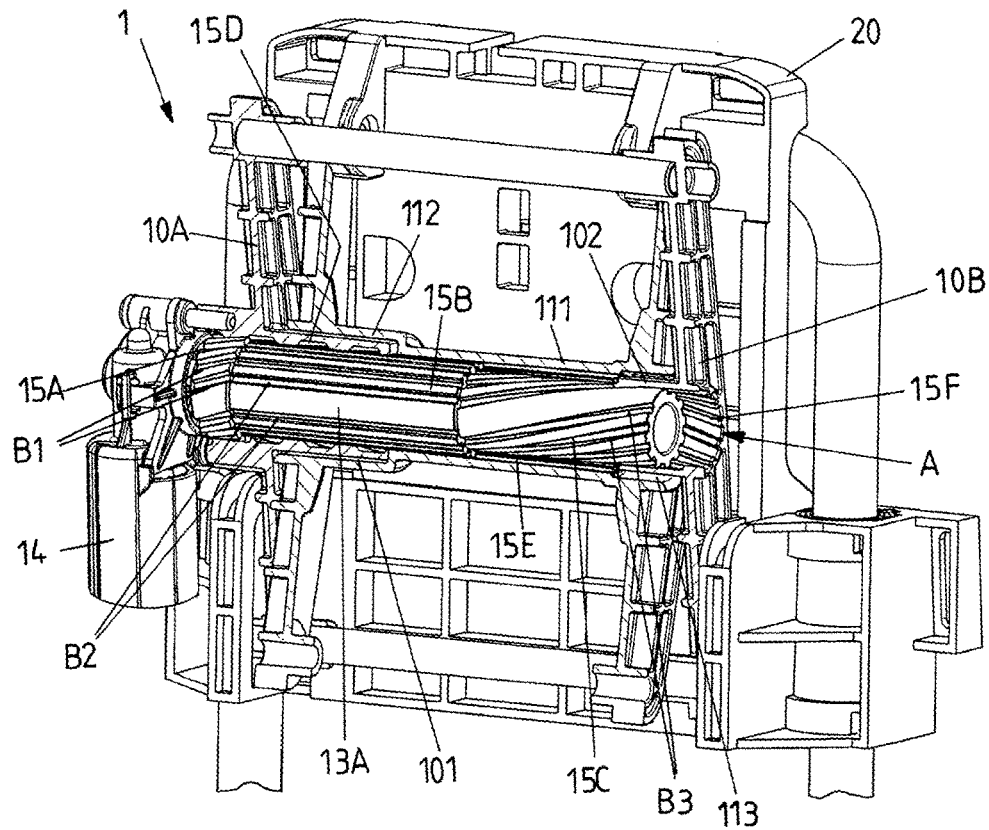

(B-B)

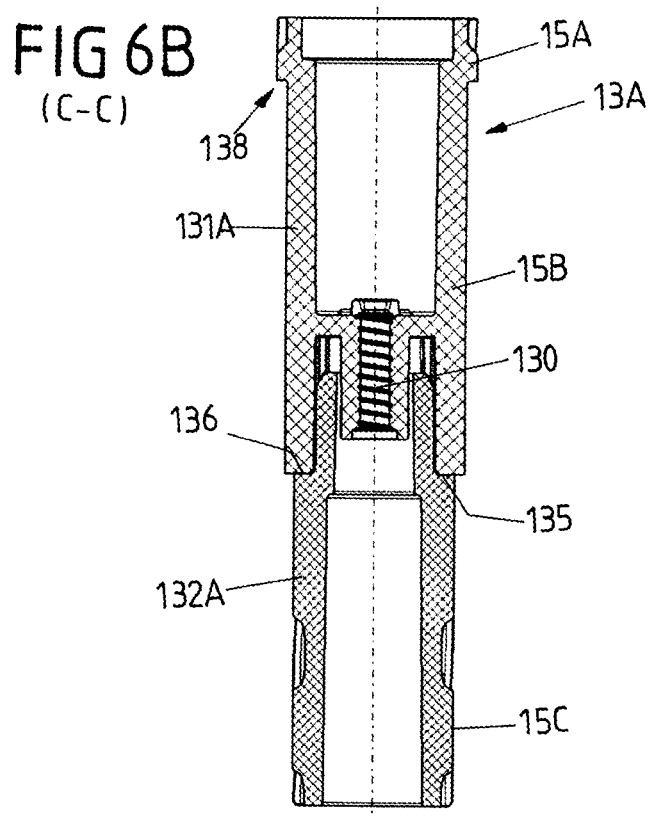
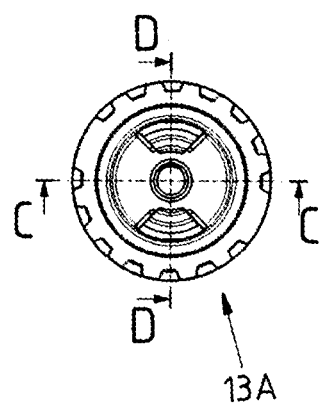
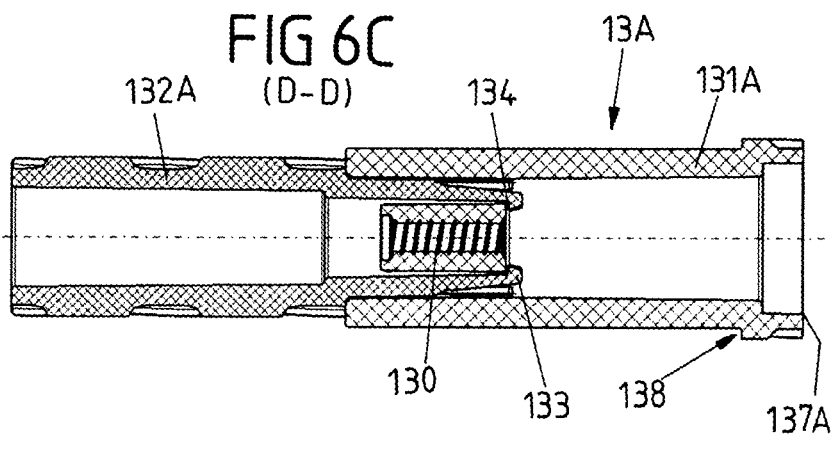
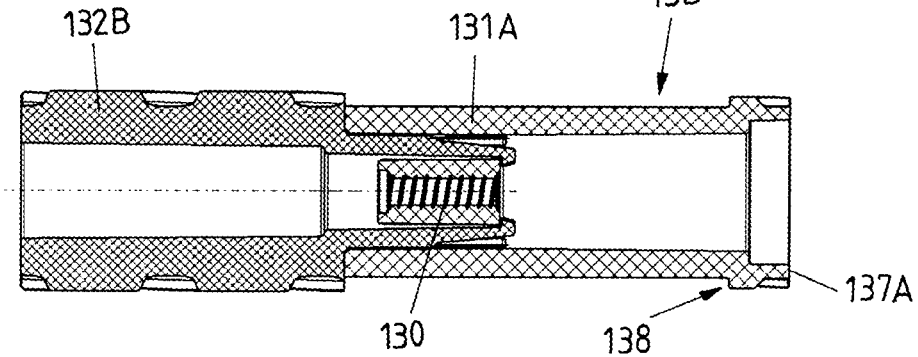

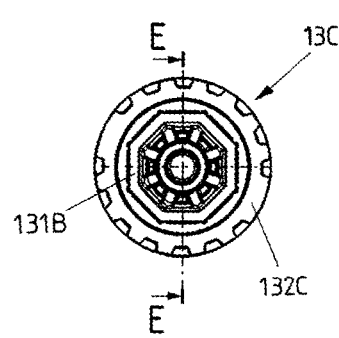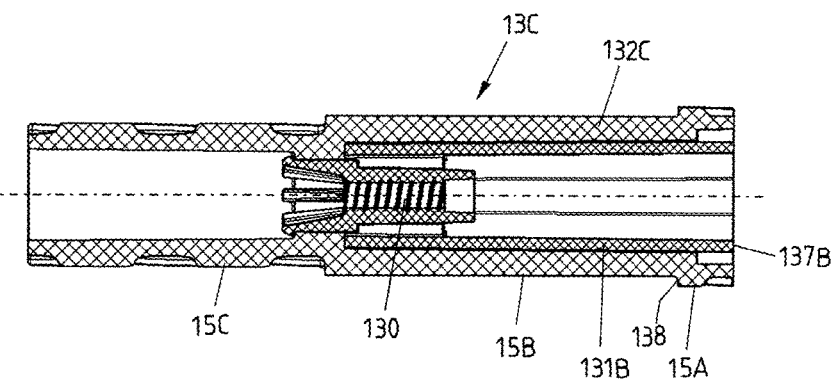

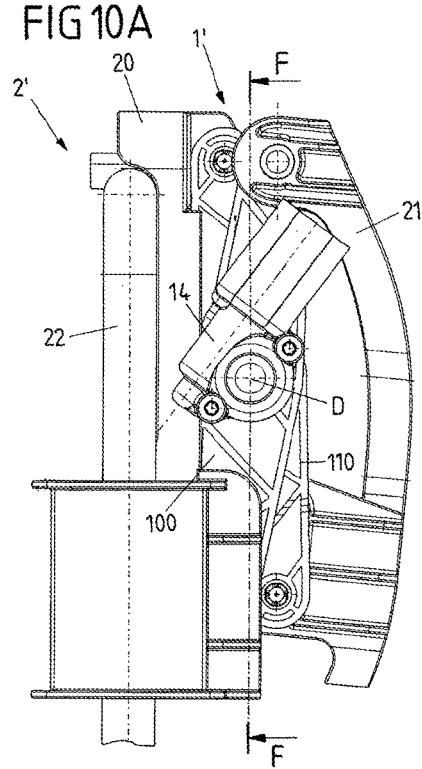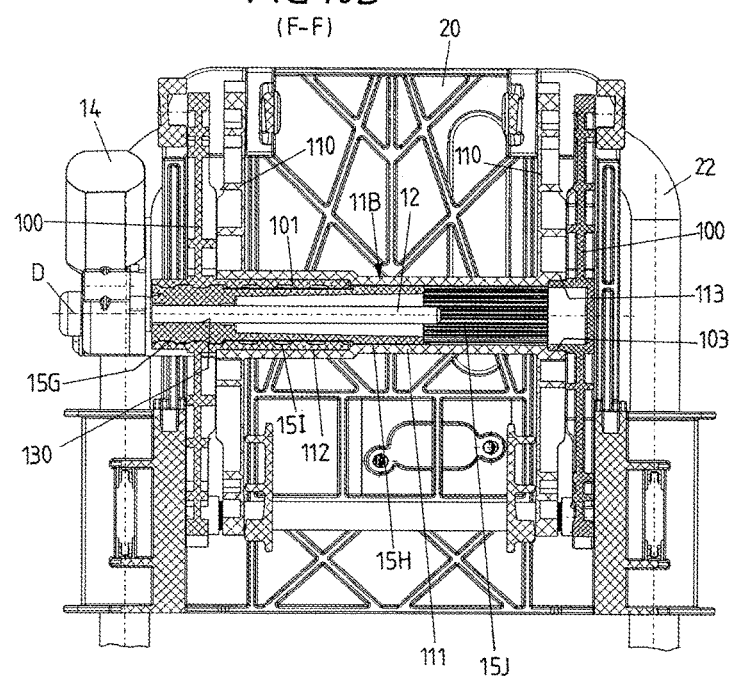

(G-G)

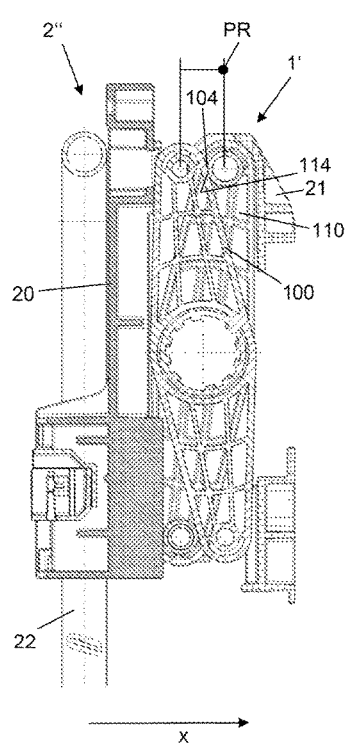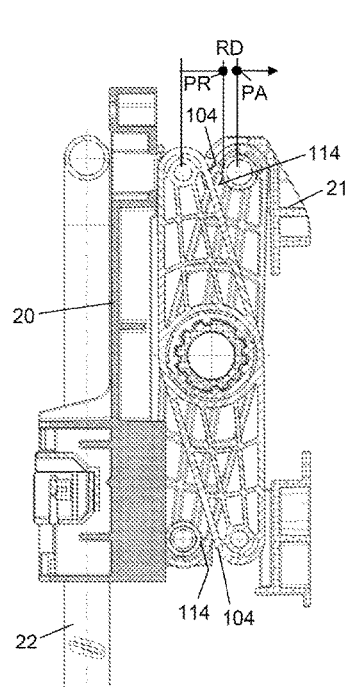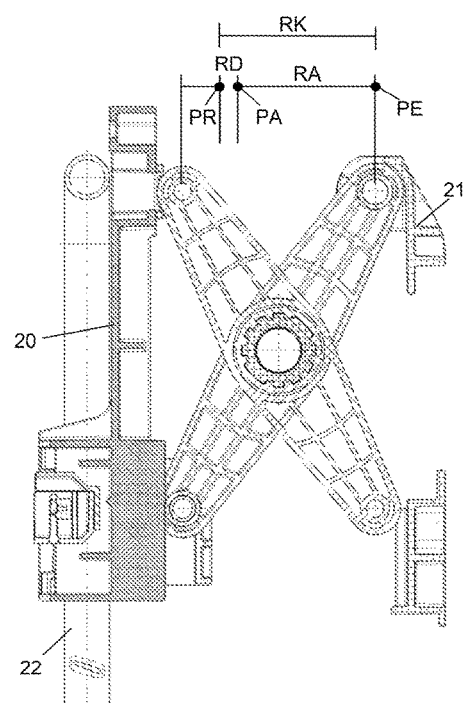

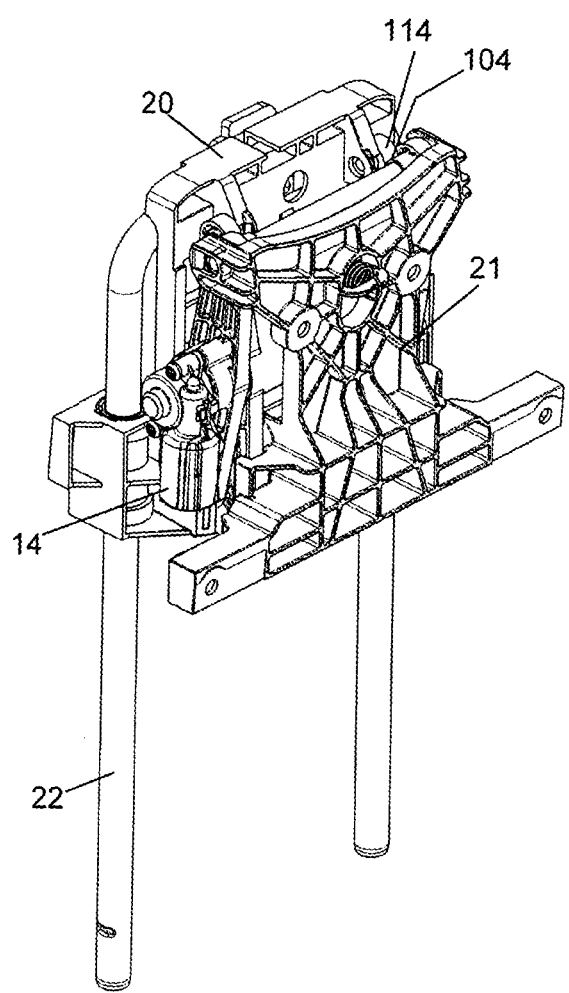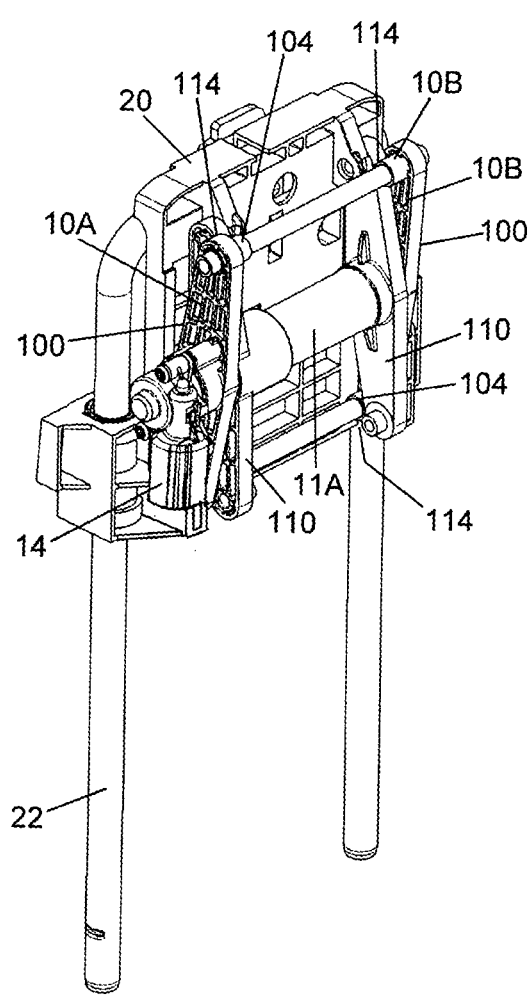

HEADREST WITH AN ADJUSTMENT DEVICE

CROSS-REFERENCE TO RELATED APPLICATIONS

This application is the U.S. National Phase of PCT Application No. PCT/EP2020/078586 filed on Oct. 12, 2020, which claims priority to German Patent Application No. DE 10 2020 203 159.2, filed on Mar. 11, 2020, the disclosures of which are hereby incorporated in their entirety by reference herein.

TECHNICAL FIELD

The present disclosure relates to a headrest with an adjustment device, a method of assembling a headrest, and a method of controlling a headrest.

BACKGROUND

A headrest of a vehicle seat may be adjustable by means of an adjustment device in a depth direction along the axis of the direction of travel so that the distance of an impact element to the back of the head of a vehicle occupant can be varied. At least two components are moved relative to each other by means of such an adjustment device.

One problem with many types of headrest adjustment devices is that the respective adjustment device mechanism has play. Such play can lead to low accuracy of adjustability and generally to reduced comfort. For example, an adjustment device with play in a vehicle may have a tendency to produce irritating rattling noises when driving. Furthermore, adjustment mechanisms can sometimes take up a large amount of space, which is too large for some applications.

An approach would be the use of a spindle drive with a spindle oriented in the displacement direction, the direction of travel of the vehicle. However, spindles that are oriented in the direction of travel would have to be enclosed in a highly secure housing to avoid a potential danger in the case of a crash for the head of a seat occupant.

SUMMARY

The object of the present disclosure is to provide an improved headrest.

Accordingly, a headrest for a vehicle seat is provided. The headrest includes an adjustment device, the adjustment device may include at least two adjusting parts and one drive element movable along an axis. It is provided that the drive element is coupled to each of the adjusting parts via meshing drive contours (the drive contours engage one another). Therein, the drive contours describe an adjustment path for each of the adjusting parts, the adjustment path of at least one of the adjusting parts having a twist with respect to the axis and differing from the adjustment path of at least one other of the adjusting parts in such a way that a movement (such as an axial movement) of the drive element along the axis causes a relative movement (e.g., rotation) between the adjusting parts, for example a rotational movement (about the axis).

This makes it possible to exert a force on two or more (e.g., three) adjusting parts with a single and easily adjustable drive element in order to adjust the adjusting parts relative to each other, e.g. one of the adjusting parts relative to the other(s) (e.g., two) or each of the adjusting parts relative to each of the others. No opposing (with respect to a sense of a twist) adjustment paths are necessary in this case, and for example no such paths are provided. Possible tolerances can be kept free of play in a simple manner by means of an external preload. This headrest can provide adjustability in the x-direction of the vehicle coordinate system by means of the adjustment device and can be held free of play in a relatively simple manner. The headrest can be set to a substantially flat configuration because the adjustment device can be designed to be flat. In the case of adjustable headrests, adjustment is typically made in an unloaded or lightly loaded condition. For example, in the proposed configuration, a force acting in the axial direction on the drive element when a torque is applied can be reduced for the same overall transmission ratio compared with a configuration with symmetrical counter-rotating twist. This makes it possible to reduce a load on a drive mechanism and a motor housing, thus making it possible to reduce the weight.

For example, the adjustment path is the path along which a point on the corresponding adjusting part is moved relative to the drive element when the drive element is displaced relative to the adjusting part along the axis. The movement of the drive element along the axis optionally causes a movement of one of the adjusting parts to the other of the adjusting parts, whereby the other adjusting parts are moved together, i.e. not relative to each other. Alternatively, each of the adjusting parts is movable relative to each other of the adjusting parts. The adjustment device serves for example to adjust at least two components relative to each other.

The adjustment device of the headrest may comprise at least three adjusting parts. This allows a symmetric application of forces.

Optionally, the drive element has an internal thread for engagement by a spindle extending along the axis, the axis being an axis of rotation. The drive element may serve as a spindle nut. The orientation of the internal thread thus defines the position of the axis of rotation. This provides a reliable and efficient adjustment.

The adjustment paths of all adjusting parts of the adjustment device either have a twist with the same sense of rotation as the adjustment path of the one of the adjusting parts, or alternatively run parallel to the axis of rotation. In other words, none of the drive contours describes a twist in the opposite direction to the other drive contours. In addition to the measures already described above, this also enables simplified production.

In an example design, the adjustment paths of two outer of the adjusting parts have a twist and/or the adjustment path of an inner adjusting part arranged between the outer adjusting parts runs parallel to the axis of rotation (and thus does not have a twist). Alternatively, it can be provided that the adjustment paths of the two outer ones of the adjusting parts run parallel to the axis of rotation and the adjustment path of the inner adjusting part arranged between the outer adjusting parts has a twist.

According to a further development, the twist of the adjustment paths of the two outer adjusting parts each have the same pitch. For example, each of these adjustment paths describes a spiral around the axis of rotation. One turn around the axis of rotation can have the same length along the axis of rotation for both spirals. Alternatively (e.g. for the two outer adjusting parts) different pitches are provided. This makes it possible to adjust two adjusting parts at different speeds relative to a third adjusting part.

In one or more embodiments, it can be provided that the adjustment path for the inner adjusting part runs parallel to the axis of rotation.

Optionally, the at least two adjusting parts each form at least one scissor lever. The scissor levers cross each other at a crossing point. At the crossing point the two adjusting parts with their scissor levers can be rotated relative to each other about the axis of rotation. This makes it possible to exert a force on two or more adjusting parts with a single drive element, a simple design and relatively little play in order to adjust the adjusting parts relative to each other. No opposing adjustment paths are necessary, especially not provided for. Since the drive element can be moved along the axis of rotation which passes through the intersection point, a relatively compact design is possible. The scissor levers form a scissor kinematics. Here it is possible to drive the scissor kinematics at the optimal point and to lock it (e.g. by holding the spindle). This also allows an optimum rigidity to be achieved.

For example, the headrest may include a component in the form of a base having mounting areas, and mounting areas of the scissor levers are mounted or mountable on the mounting areas of the base. This allows a modularized construction. A module with the adjustment device may be mounted on the base, and, alternatively, a non-adjustable front pad may be mounted on the base. Hence, the same design of the base may be used for a large number of different use cases.

Thus, optionally, a preassembled x-adjustment module may include the adjusting parts may be mounted or mountable on the base by means of the mounting areas. The x-adjustment module allows an adjustment along an x axis. The x axis may be, in use, aligned horizontally and in the direction of the back of a seat user's head.

According to an embodiment, the mounting areas of the scissor levers are arranged at longitudinal ends of the scissor levers. This enables a simple design occupying only little space.

Optionally, a latching element, e.g., with a lead-in chamfer, is provided at least at one of the mounting areas of the base. The lead-in chamfer may be designed so as to elastically deflect the corresponding scissor lever aside. The scissor lever may then snap into a receptacle defined by the latching element. Thereby, the assembly of the headrest can be further simplified.

For example, the base is mounted or mountable on a headrest rod, for example on a pair of headrest rods, so as to be displaceable relative thereto, for example along a z axis, and the z axis may be different from the x axis, for example perpendicular or substantially perpendicular thereto. By this, a two-way adjustable headrest can be provided, for example as a part of a construction set allowing to assemble, as an alternative, the base to a front pad to provide a headrest that is adjustable along the z axis, but not along the x axis.

For example, the adjusting parts together form a tubular receptacle for the drive element. For example, the drive element can be moved along the axis of rotation within the receptacle. Together with the drive element, the adjusting parts can thus form a tubular drive.

At least one additional component can be coupled with the adjusting parts, such as movable. As an example, two components can be provided which are coupled to the adjusting parts, and the two components can be moved relative to one another by a movement of the adjusting parts relative to one another. One of the components may be the base. The components are connected, for example, to each of the adjusting parts via a joint, e.g. via a swivel joint or a sliding swivel joint. In this way, it is possible, by means of the movement of the drive element along the axis of rotation, to effect a rotation of the adjusting parts relative to each other in a first stage, which is then converted in a second stage into a movement which comprises a translation or consists of a translation. One of the components is a support element which optionally comprises or carries a cushion, e.g. an impact element of the headrest.

By moving the two components relative to each other, especially the distance between the two components can be changed. In one configuration, one of the two components can be extended, e.g. in relation to the other of the two components it can be moved between a retracted position and an extended position, for example by means of the adjusting parts. For example, the extendable component is the impact element of the headrest.

The adjustment device optionally comprises a drive unit with a motor. Activation of the motor may effect a movement of one of the two components with respect to the other of the two components. This allows an automatic adjustment and an improved comfort for a user.

The retracted position and the extended position define a kinematical range. According to an embodiment, a control unit (e.g., of the headrest, for example of the adjustment device or of the drive unit) is provided and adapted to control operation of the motor such that a stationary (fixed) adjustment of the one of the two components with respect to the other of the two components is restricted to the retracted position and an adjustable range, the adjustable range being smaller than the kinematical range. On the other hand, a portion of the kinematical range between the retracted position and the adjustable range may be disallowed by the control unit. For example, the control unit does not stop operation of the motor in the disallowed range. For example, when the user attempts to adjust the headrest in the disallowed range, the control unit continues displacement of the one of the two components until the component is in the retracted position or within the adjustable range. This allows to avoid portions that define a mechanical end stop (defining an end of the kinematical range) to contact one another in use. Thereby, in turn, rattling noises can be effectively avoided. In other words, the control unit is adapted to prevent a (stationary) setting of the headrest in a disallowed range, the disallowed range being between the retracted position and the adjustable range. The control unit may be adapted to terminate an adjustment process only when the one of the two components with respect to the other of the two components is arranged in the retracted position or in the adjustable range.

According to another embodiment, a headrest is provided. The headrest may include two components, one of the two components being movable with respect to the other of the two components between a retracted position and an extended position. The headrest further may include a drive unit provided with a motor, and activation of the motor effects a movement of the one of the two components with respect to the other of the two components. Therein, the retracted position and the extended position define a kinematical range, and a control unit is provided and adapted to control operation of the motor such that a (stationary, steady, persistent) adjustment (that is assumed and maintained) of the one of the two components with respect to the other of the two components is restricted to the retracted position and an adjustable range, the adjustable range being smaller than the kinematical range. Regarding the further details of the control unit of this headrest reference is made to the description above and below.

An end stop may define the retracted position or the extended position. For example, one end stop defines the retracted position and another end stop defines the extended position.

Further, the end stop(s) may be defined by stop portions of the scissor levers. A contact of the stop portion of one of the scissor levers with the stop portion of another one of the scissor levers prevents a continued motion of the scissor levers with respect to one another. By providing such stop portions, a relatively high stiffness and a retracted position being free of any play can be achieved.

According to an embodiment, the stop portions are arranged at longitudinal ends of the scissor levers. This allows a relatively high stiffness in the retracted position.

Optionally, a return spring is provided which preloads the two components in one direction, preferably in the direction in which a load acts during use, for example in the direction towards one another. In general, a return spring may be provided to provide a preload between at least two of the adjusting parts. The return spring may act on the adjusting parts or on the components, or at one side on one adjusting part and on the other side on one of the components. By means of the return spring the adjustment device can easily be kept free of play.

One or more of the drive contours can be in the form of a toothing. In this way, e.g. tilting can be prevented, as a large contact surface is made possible. Those drive contours which describe an adjustment path with a twist are, for example, designed as twist toothing and/or have at least one twist groove. The toothing can describe a helical line. For example, at least one of the toothing is designed to extend spirally around the axis of rotation. The toothing(s) describing a twist can each have a thread pitch which is in each case e.g. larger than a thread pitch of the internal thread of the drive element. Alternatively or additionally, one or more toothing are axially aligned, i.e. they have an infinite thread pitch. An axially aligned toothing can usually be produced relatively easily, e.g. with an open-close tool.

For example, for each of the adjusting parts, a drive contour is formed on the respective adjusting part, and a drive contour respectively engaging with it is formed on the drive element. For example, the drive contours on at least one or all of the adjusting parts are designed in the form of internal toothing and the associated drive contour(s) on the drive element are designed in the form of external toothing.

For example, the drive contours of the drive element for the respective adjusting parts are arranged next to each other along the axis of rotation. This makes it possible to easily provide different adjustment paths for the adjusting parts.

Optionally, the drive element is designed in one part. Alternatively, the drive element is designed in several parts, for example two parts. This allows an optimization of the material in certain areas of the drive element and a simplified production of the adjustment device. The two parts can be connectable or connected to each other in a rotationally-fixed manner. For example, the drive element comprises at least two parts, one part being made of a different material or a different material combination than the other part. For example, the drive element comprises an input part and an output part. The input part has the internal thread. The output part has at least one of the drive contours. For example, both parts each consist of a plastic, for example of different plastics. A one-piece drive element can also consist of a plastic.

The drive part can be firmly connected to the output part by means of scraper ribs, for example without play. This enables a relatively secure connection of the parts to each other.

The input part can be positively connectable or connected to the output part by means of a snap-in connection (or in any other way). For example, the two parts can be or are plugged into each other. This enables an easy assembly. Alternatively or additionally a material-locking connection is provided, e.g. a welded connection. As an example, it may be provided that the connection is first made by the scraper ribs and that this connection is secured by an additional positive fit and/or a material connection.

In a further development, the input part is optimized for sliding. For example, the input part has a lower coefficient of sliding friction compared to the output part (especially on steel and/or on the material of the spindle). This allows the internal thread to engage with the spindle relatively smoothly.

As an alternative or in addition, the output part has a higher strength than the input part (and/or consists e.g. of a high-strength plastic). This allows a safe and long-lasting engagement of the corresponding drive contours. Furthermore, the part of the drive element which is made of a stronger material can have a drive contour which (perpendicular to the axis of rotation) has a smaller maximum outside diameter than the other part. This in turn makes it possible to insert the assembled drive element from one side into the tubular receptacle of the adjusting parts.

Optionally, the output part (perpendicular to the axis of rotation) has the same maximum outside diameter as the input part. Due to the two-part design, the still separate parts of the drive element can then be inserted on both sides into the receptacle of the adjusting parts and fastened to each other, for example locked together, therein. An intermediate drive contour (e.g. an axially aligned toothing), for example, has a smaller outer diameter than the outer drive contours.

According to an aspect, a headrest for a vehicle seat is provided, and the headrest may be designed in accordance with any aspect or embodiment described herein. The headrest comprises two components and an adjustment device with at least two adjusting parts and a drive unit including a motor. It is provided that an activation of the motor effects a movement of one of the two components with respect to the other of the two components. Therein, by means of the adjusting parts, the one of the two components is movable with respect to the other of the two components between a retracted position and an extended position defining a kinematical range, and a control unit is adapted to control operation of the motor such that a stationary adjustment (of a position that the component assumes and maintains) of the one of the two components with respect to the other of the two components is restricted to the retracted position and an adjustable range. The adjustable range is smaller than the kinematical range. The adjustable range is displaced from the retracted position.

According to an aspect, a construction set for assembling a headrest is provided. The construction set comprises a height-adjustment module with a component having mounting areas, a depth-adjustment module having mounting areas that are mountable on the mounting areas of the height-adjustment module so as to assemble a height-and-depth-adjustable headrest, for example according to any aspect or embodiment described herein, and a front pad having mounting areas that are, as an alternative, also mountable on the mounting areas of the height-adjustment module so as to assemble a height-adjustable headrest (not being depth-adjustable). This modularized construction allows to use the same height-adjustment module for an increased number of use cases.

According to an aspect, a method for assembling a headrest is provided. The method comprises providing a height-adjustment module with a component having mounting areas, providing a depth-adjustment module having mounting areas that are mountable on the mounting areas of the height-adjustment module so as to assemble a height-and-depth-adjustable headrest, for example according to any aspect or embodiment described herein. The method further comprises providing a front pad having mounting areas that are (also, as an alternative) mountable on the mounting areas of the height-adjustment module so as to assemble a height-adjustable (height-only-adjustable) headrest. The method further comprises mounting a selection of either the depth-adjustment module or the front pad on the height-adjustment module (by means of the mounting areas) to assemble the height-and-depth-adjustable headrest or the height-adjustable (height-only-adjustable) headrest.

According to an aspect, a method for controlling adjustment of a headrest for a vehicle seat, for example of a headrest according to any aspect or embodiment described herein, is provided. The headrest comprises two components and an adjustment device with at least two adjusting parts and a drive unit including a motor. Therein, activation of the motor effects a movement of one of the two components with respect to the other of the two components, and, by means of the adjusting parts, one of the two components is movable with respect to the other of the two components between a retracted position and an extended position defining a kinematical range. The method comprises controlling operation of the motor such that a stationary adjustment of the one of the two components with respect to the other of the two components is restricted to the retracted position and an adjustable range, the adjustable range being smaller than the kinematical range.

According to an aspect, a vehicle seat is provided which includes a headrest with an adjustment device according to any configuration described herein. For the advantages of this vehicle seat, reference is made to the advantages indicated for the headrest.

BRIEF DESCRIPTION OF THE DRAWINGS

The idea underlying the invention will be explained in more detail below using the embodiments shown in the figures. In schematic representations:

FIG. 1 shows a perspective view of a headrest with an adjustment device in a retracted position;

FIG. 2 shows a perspective and partially cut open view of the headrest as shown in FIG. 1;

FIGS. 6A-6C show views of a drive element of the adjustment device of the headrest according to FIGS. 1 to 5B;

FIG. 7 shows a sectional view of a drive element for the adjustment device of the headrest according to FIGS. 1 to 5B;

FIGS. 8A and 8B show views of a drive element for the adjustment device of the headrest according to FIGS. 1 to 5B;

FIG. 10A shows a side view of the headrest according to FIG. 9;

FIG. 10B shows a sectional view of the headrest according to the sectional plane F-F shown in FIG. 10A;

FIGS. 15A-15C show different adjustment positions of two components of a headrest with respect to one another; and FIGS. 16A, 16B show a kinematic end position of the headrest of FIGS. 15A-15C.

DETAILED DESCRIPTION

Figure 3A:
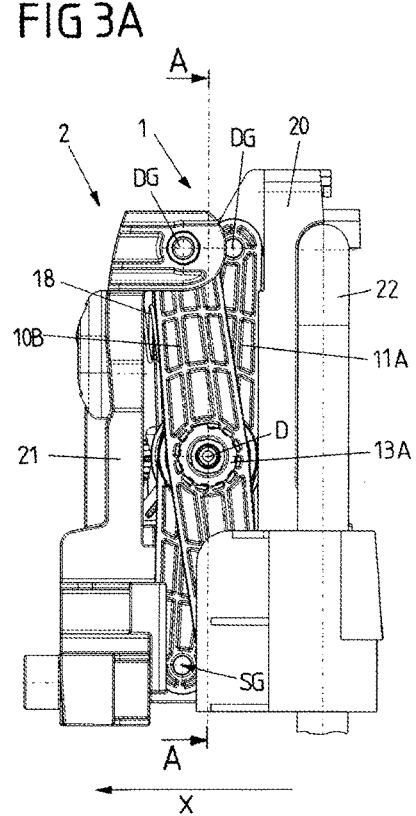
FIG. 3A shows a side view of the headrest as shown in FIGS. 1 and 2.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

EP 1 661 753 A2 describes a headrest of a vehicle seat including a head support portion for supporting a head of a passenger, and a drive unit for moving the head support portion. Therein, a pair of cross bar links is provided, wherein each of the cross bar links is composed of outer and inner cross bars that are rotatably interconnected via a pivot pin.

FIGS. 1 to 5B show different views of a headrest 2 for a vehicle seat. The headrest 2 comprises an adjustment device 1 which can be displaced from a retracted position to an extended position. FIGS. 1 to 3B show the retracted position and FIGS. 4 to 5B the extended position. The headrest 2 can also be adjusted to several intermediate positions between the retracted position and the extended position. The adjustment device 1 comprises a tubular drive, which is explained in more detail further below.

The headrest 2 comprises a base 20, which is mounted on a headrest rod 22. The headrest rod 22 is used to attach the headrest 2 to a vehicle seat. The headrest rod 22 has two parallel sections. In the present example, the headrest rod 22 is U-shaped. Furthermore, the headrest 2 comprises an impact element 21, which can be designed in the form of a plate, for example. The impact element 21 can be seen in the side view of FIG. 3A. The impact element 21 defines a bumper surface provided to support the head of a seat user, such as in the event of a vehicle crash. In order to absorb an impact of the head against the impact element 21 as well as possible, the impact element 21 can be adjusted relative to the base 20 by means of the adjustment device 1, in this case along a longitudinal direction X. This adjustability also enables a relatively ergonomic and comfortable adjustment of the headrest 2. Additional elements such as a separate front pad (e.g. as a foam support) can be attached to the impact element 21.

The adjustment device 1 comprises a double scissor mechanism. This is formed by several, in this case three, adjusting parts 10A, 10B, 11A. Two outer adjusting parts 10A, 10B are provided, each forming a scissor lever 100. Furthermore, an inner adjusting part 11A is provided, which is arranged between the two outer adjusting parts 10A, 10B. The inner adjusting part 11A forms two scissor levers 110. The inner adjusting part 11A is H-shaped and has a cross member 111 which connects the two scissor levers 110. The inner adjusting part 11A is designed in one piece in the example shown. The first adjusting parts 10A, 10B are also each designed in one piece.

The scissor lever 100 of each of the outer adjusting parts 10A, 10B is located adjacent to one of the scissor levers 110 of the inner adjusting part 11A. The adjacently arranged scissor levers 100, 110 cross each other at a crossing point K. The scissor levers 100, 110 are each elongated with two longitudinal ends and the crossing point K is located between the longitudinal ends of each of the scissor levers 100, 110. The scissor levers 100, 110 can be rotated relative to each other about an axis of rotation D. The axis of rotation D passes through the crossing points K of the two pairs of scissor levers 100, 110.

Each of the scissor levers 100, 110 is connected to the base 20 via one of the longitudinal ends. In this case the scissor levers 110 of the inner adjusting part 11A are pivotally mounted to the base 20 via swivel joints DG. The scissor levers 100 of the outer adjusting parts 10A, 10B are each mounted on a sliding swivel joint SG on the base 20, which in the example shown is formed in each case by a projection which is rotatably mounted in a slotted guide. The swivel joints DG are each formed by a dome 16 rotatably mounted in a receptacle. In the example shown, the domes 16 are each formed on the corresponding scissor lever 100, 110. Optional stiffening struts 17 connect the ends of the jointly movable scissor levers 100, 110.

In the present case, the swivel joints DG are arranged at the top and the sliding swivel joints SG at the bottom in relation to the intended use of the headrest 2, although other arrangements are also conceivable. It would also be possible to mount the inner adjusting part 11A via sliding swivel joints and the outer adjusting parts 10A, 10B via swivel joints at the base 20.

At the respective other longitudinal ends, the scissor levers 100, 110 of the outer adjusting parts 10A, 10B and of the inner adjusting part 11A are connected to the impact element 21, in this case the scissor levers 100 of the outer adjusting parts 10A, 10B (at the top) via swivel joints DG and the scissor levers 110 of the inner adjusting part 11A (at the bottom) via sliding swivel joints SG. By turning the outer adjusting parts 10A, 10B relative to the inner adjusting part 11A the adjustment device 1 can thus be displaced between the retracted position and the extended position.

To drive a corresponding adjusting movement, the adjustment device 1 comprises a drive unit 14. The drive unit 14 comprises an electric motor. The drive unit 14 is attached to one of the adjusting parts 10A, 10B, 11A, here to an outer adjusting part 10A (alternatively e.g. to the inner adjusting part 11A). If the adjusting parts 10A, 10B, 11A are thus adjusted relative to each other, then the drive unit 14 is also moved relative to the base 20 (and relative to the impact element 21).

Figure 3B:
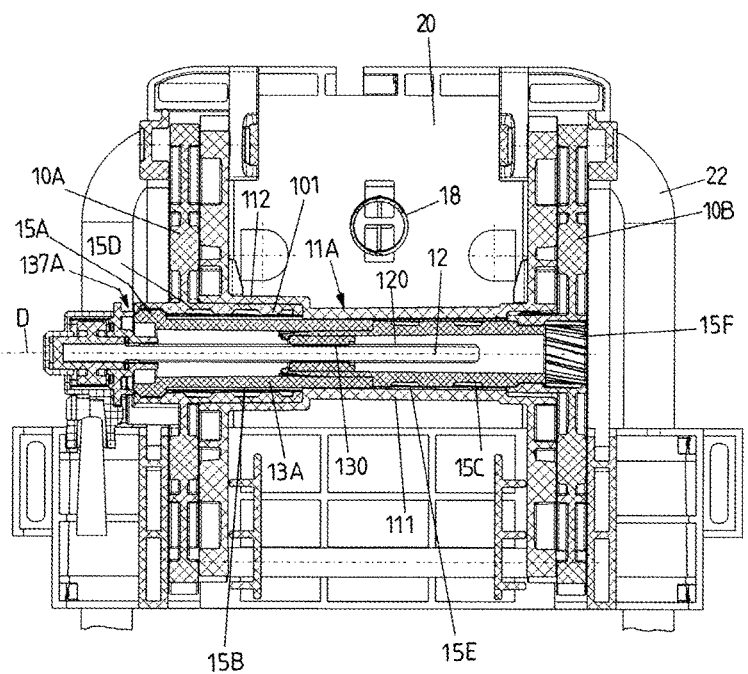
FIG. 3B shows a sectional view of the headrest according to the sectional plane A-A shown in FIG. 3A.
Figure 4:
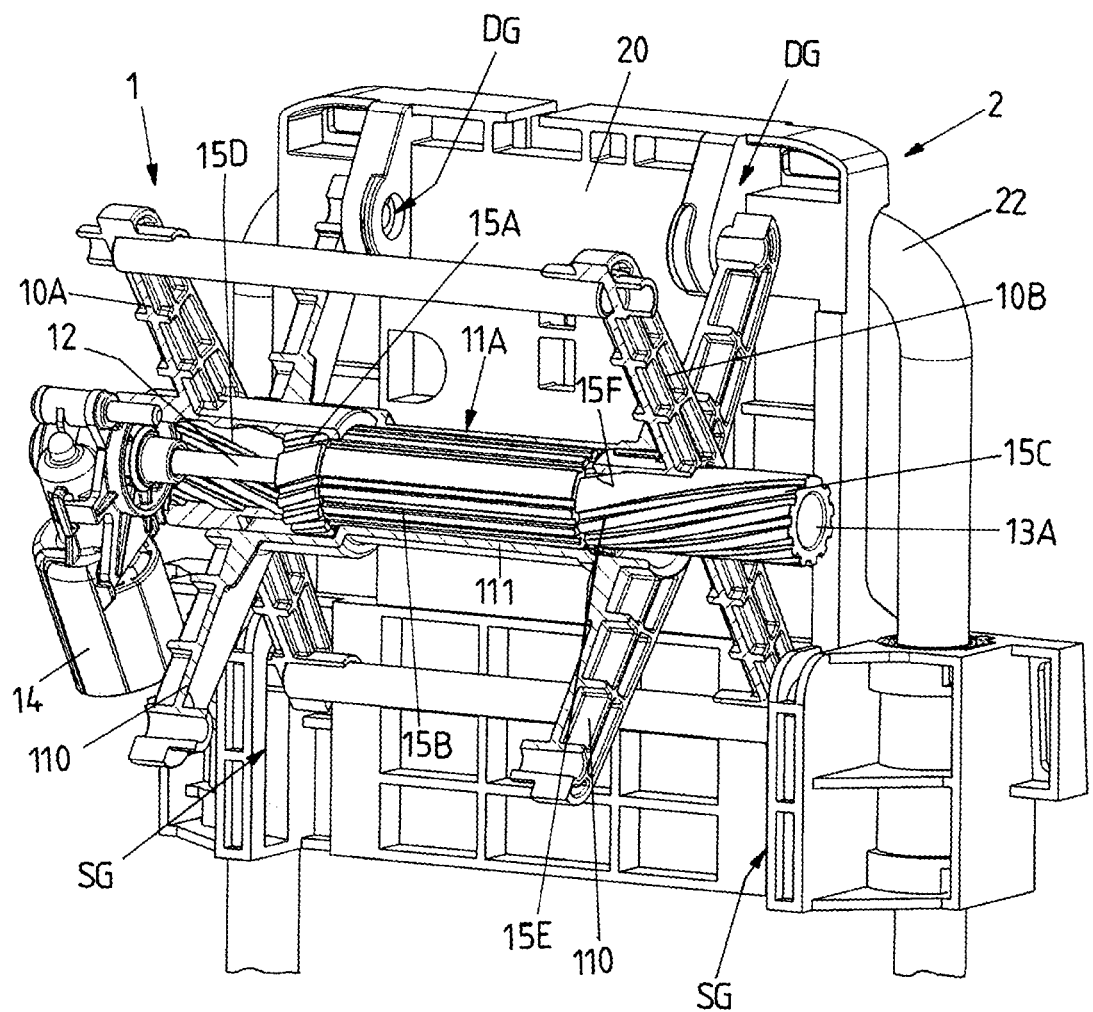
FIG. 4 shows a perspective view of the headrest as shown in FIGS. 1 to 3B, the adjustment device being shown in an extended state.
Figure 5A:
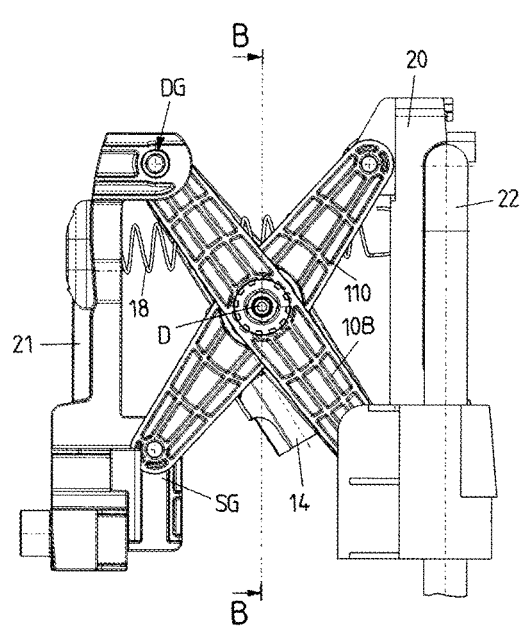
FIG. 5A shows a side view of the headrest as shown in FIG. 4.
Figure 5B:
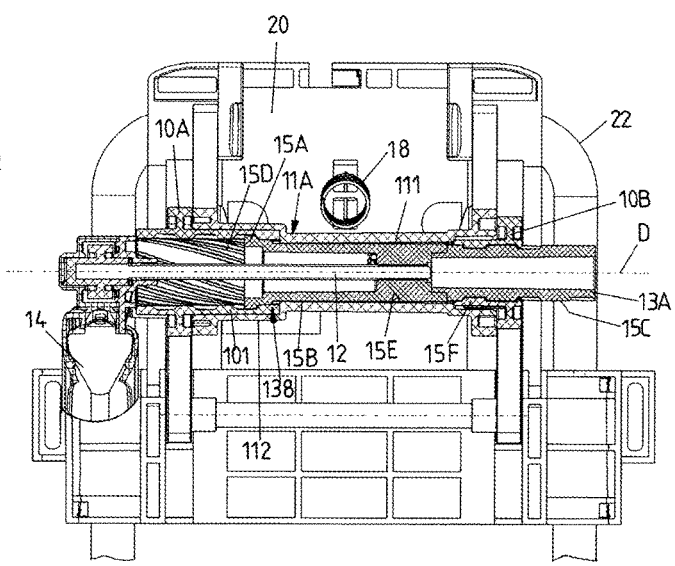
FIG. 5B shows a sectional view of the headrest according to the sectional plane B-B shown in FIG. 5A.

The drive unit 14 drives (via a gearbox) a spindle 12 (see especially FIGS. 3B, 4 and 5B). The spindle 12 extends along the axis of rotation D. Activating the drive unit 14 causes the spindle 12 to rotate about the axis of rotation D. It is worth noting that the spindle 12 is not arranged in parallel to the adjustment direction, but vertical thereto. Correspondingly, when mounted in a vehicle with the adjustment direction parallel to the (normal, straight) direction of travel, the spindle 12 is arranged vertical thereto.

The spindle 12 has an external thread 120. The external thread 120 is engaged with an internal thread 130 of a drive element in the form of a spindle nut 13A. The spindle nut 13A has several drive contours 15A-15C (see especially FIGS. 2 and 4). The drive contours 15A-15C are formed on an outer shell surface of the spindle nut 13A (side by side as seen along the axis of rotation D). One drive contour 15A, 15B, 15C is assigned to each of the adjusting parts 10A, 10B, 11A. The adjusting parts 10A, 10B, 11A each have a drive contour 15D-15F. The drive contour 15D-15F of each of the adjusting parts 10A, 10B, 11A is in engagement (with respect to a relative rotation about the axis of rotation D in a positive connection) with the drive contour 15A-15C of the spindle nut 13A assigned to the respective adjusting part 10A, 10B, 11A.

It is provided that the drive element 13A is coupled to the adjusting parts 10A, 10B, 11A via the meshing drive contours 15A-15F, which describe at least one adjustment path B1-B3 for each of the adjusting parts 10A, 10B, 11A, and the adjustment path B1-B3 of at least one of the adjusting parts 10A, 10B, 11A has a twist with respect to the axis of rotation D and differs from the adjustment path B1-B3 of at least one other of the adjusting parts 10A, 10B, 11A, so that a movement of the drive element 13A-13C along the axis of rotation D causes a relative movement between the adjusting parts 10A, 10B, 11A.

The drive contours 15A-15F are each designed in the form of (respectively interlocking) toothing. The drive contours 15A-15C on the spindle nut 13A are designed in the form of external toothing, the drive contours 15D-15E on the adjusting parts 10A, 10B, 11A each in the form of internal toothing. Due to the engagement, the drive contours 15A, 15C, 15D, 15F for the external adjusting parts 10A, 10B each describe a plurality of adjustment paths B1-B3. Along the adjustment paths B1-B3, the adjusting parts 10A, 10B, 11A and the spindle nut 13A slide along each other when the spindle nut 13A is displaced relative to the adjusting parts 10A, 10B, 11A along the axis of rotation D. Since the drive contours 15A-15F are each formed by interlocking toothing, such an adjustment path B1-B3 is each described by a tooth engaging in a groove. This enables a relatively precisely guided motion with little play and a long life, as well as good planar power transmission and thus high strength. In general, however, an adjustment path described by a projection engaging in a single groove would be sufficient in principle.

In this example, the drive contours 15A, 15C, 15D, 15F for the outer adjusting parts 10A, 10B each run spirally around the axis of rotation D. As a result, the adjustment paths exhibit a twist in relation to the axis of rotation D. The twist of the adjustment paths of the two outer adjusting parts 10A, 10B is in the same direction (the helixes have the same sign). The adjustment paths B1, B3 each have the same pitch, so that the two outer adjusting parts 10A, 10B are adjusted synchronously. As an alternative it would be possible that these pitches are different (but, for example, still with the same direction), in order to achieve faster turning of one of the outer adjusting parts 10A, 10B, which e.g. would allow a shorter design of the corresponding swivel arm 100.

The drive contours 15B, 15E for the inner adjusting part 11A, i.e., drive contour 15B on the spindle nut 13A and drive contour 15E on the inner adjusting part 11A, are each aligned parallel to the axis of rotation D, they have no twist, in other words an infinitely large pitch, and thus form an axial guidance. The drive contours 15B, 15E for the inner adjusting part 11A thus serve as axial guide.

The corresponding adjustment paths B2 run parallel to the axis of rotation D. The spindle nut 13A can thus be moved along the axis of rotation D relative to the inner adjusting part 11A without being turned relative to it. In contrast, a displacement of the spindle nut 13A along the axis of rotation D relative to the two outer adjusting parts 10A, 10B causes a rotation of the outer adjusting parts 10A, 10B relative to the spindle nut 13A. This means that when the spindle nut 13A is displaced along the axis of rotation D as a result of a rotation of spindle 12, the outer adjusting parts 10A, 10B are rotated relative to the inner adjusting part 11A.

The adjusting parts 10A, 10B, 11A together form a tubular receptacle A, in which the spindle nut 13A can be displaced along the axis of rotation D. The outer adjusting parts 10A, 10B are each rotatably mounted on the inner adjusting part 11A. For this purpose, the outer adjusting parts 10A, 10B each have a cylinder section 101, 102, which is inserted into a corresponding bushing 112, 113 of the inner adjusting part 11A. The drive contours 15D, 15F formed on the outer adjusting parts 10A, 10B are arranged on these cylinder sections 101, 102. The drive contour 15E formed on the inner adjusting part 11A is arranged on the cross member 111.

In the example shown in FIG. 1-5B, the drive contours 15A-15C, viewed in one direction, have outer diameters that decrease stepwise in comparison to each other. An outer first drive contour 15A has the largest outer diameter, a middle second drive contour 15B has a smaller outer diameter and an outer third drive contour 15C has an even smaller outer diameter. This allows the spindle nut 13A to be inserted from one side into the receptacle A formed by the adjusting parts 10A, 10B, 11A. In addition, a stop surface for an end stop 138 of the spindle nut 13A for the extended position can be easily realized. This stop surface is formed by a corresponding constriction at the end of the drive contour 15D of the (motor-side) outer adjusting part 10A (see e.g. FIG. 3B). The end stop 138 is formed by a step of the spindle nut 13A (see e.g. FIGS. 6B and 6C).

In the retracted position (see e.g. FIG. 2), the spindle nut 13A is completely accommodated in the receptacle A. In the extended position (see e.g. FIG. 4) the spindle nut 13A protrudes from the receptacle A. An end stop 137A adjacent to the drive unit 14 defines the retracted position.

In the example shown, the drive contours 15A-15F can also be referred to as toothing sections. It should be noted, however, that other types of drive contours can also be used. For example, instead of axially aligned toothings for the drive contours 15B, 15E for the inner adjusting part 11A, other axially extended positive locking contours can also be used, e.g. polygonal contours, such as a square contour or a hexagonal contour, or a star contour.

A pretensioning element pretensions the adjustment device 1 in the retracted position. Here the pretensioning element is designed in the form of a return spring 18, for example in the form of a spiral spring. The return spring 18 (see for example FIG. 5A) is fixed with one side to the base 20 and with the other side to the impact element 21, specifically, hooked in. Since none of the drive contours 15A-15F or adjustment paths B1-B3 runs in the opposite direction to another of the drive contours 15A-15F or adjustment paths B1-B3, this one return spring 18 is sufficient to keep all gear stages and also the bearing points DG, SG free of play.

FIGS. 6A to 6C show further details of the spindle nut 13A. The spindle nut 13A is multi-part, in this example it is made of two parts. It comprises an input part 131A and an output part 132A. The input part 131A comprises the internal thread 130. The output part 132A is firmly (especially torsionally rigid) connected to the input part 131A. For this purpose, the input part 131A comprises several passages for latching hooks 133 of the output part 132A (see for example FIG. 6C). For assembly, the output part 132A is inserted into the input part 131A (for example pressed in) until the latching hooks 133 reach through the passages and engage positively with latching edges 134 of the input part 131A. Thereby a stop 136 on the output part 132A strikes against a stop 135 on the input part 131A.

Due to the fact that the spindle nut 13A has a multi-piece design, individual adaptation to different applications is easily possible. Furthermore, the spindle nut can be mounted directly in receptacle A. This means that the outer diameter that grips last when pushed in can be made relatively large.

In the circumferential direction, the passages alternate with webs, via which an inner section with the internal thread 130 is connected to an outer section of the input part 131A. These webs prevent rotation of the parts 131A, 132A relative to each other. As an alternative or in addition to a form-fitting anti-rotation means, an interference fit between the output part and the input part can serve as anti-rotation means. As an alternative or in addition, interlocking gear teeth are provided on the contact surfaces of the two parts.

The input part 131A and the output part 132A are inserted into each other over a length that ensures coaxial alignment.

The input part 131A and the output part 132A are made of different materials. In this case both parts are made of plastic. As an example, the input part 131A can be made of a (slide-optimized) POM (polyoxymethylene). This allows the input part to be easily guided along the fast rotating spindle. The output part 132A, for example, has a high-strength plastic and/or a plastic which has a higher strength than the material of the input part 131A. In this way, e.g. a smaller outer diameter of the drive contour 15C of the output part 132A compared to the drive contour 15A of the input part 131A can be compensated. In an optional design, the output part 132A is made of steel, e.g. as a cold extruded part.

It can also be seen that an end face of the spindle nut 13A forms the end stop 137A.

FIG. 7 shows a spindle nut 13B for adjustment device 1, where the output part 132B is designed with a larger outside diameter compared to the spindle nut according to FIG. 6A-6C. In this case, the corresponding drive contours for the outer adjusting parts 10A, 10B have the same outer diameter. During assembly, the input part 131A and the output part 132B are inserted into the two opposite openings of the receptacle A of the adjustment device 1 (with correspondingly adapted inner diameters of the adjusting parts) and locked together inside the receptacle A.

FIGS. 8A and 8B show a spindle nut 13C for the adjustment device 1, which is designed in two parts, but where the input part 131B is completely accommodated in the output part 132C and does not protrude from the output part in the direction of the axis of rotation D, as in the examples shown in FIGS. 6A to 7. In the example of FIGS. 8A and 8B, all drive contours 15A-15C are formed on the output part 132C, specifically, on its lateral surface.

The input part 131B and the output part 132C are pressed axially into each other. A relatively precise coaxial alignment of the parts is possible via the guide length, which corresponds to the entire length of the input part 131B. The input part 131B has a cross-section that describes a polygon, here, an octagon. The output part 132C has a matching inner shape. Thus the parts are secured against rotation. In this example (and also generally possible with multi-part spindle nuts) an oversize joint with scraper ribs is also provided. This ensures that the parts are held securely together in the axial direction. A snap-in connection of the parts is also provided. Alternatively or additionally, in addition to pressing the parts together, it is possible to glue and/or weld the parts together.

The input part 131B forms the end stop 137B (for the retracted position).

Figure 9:
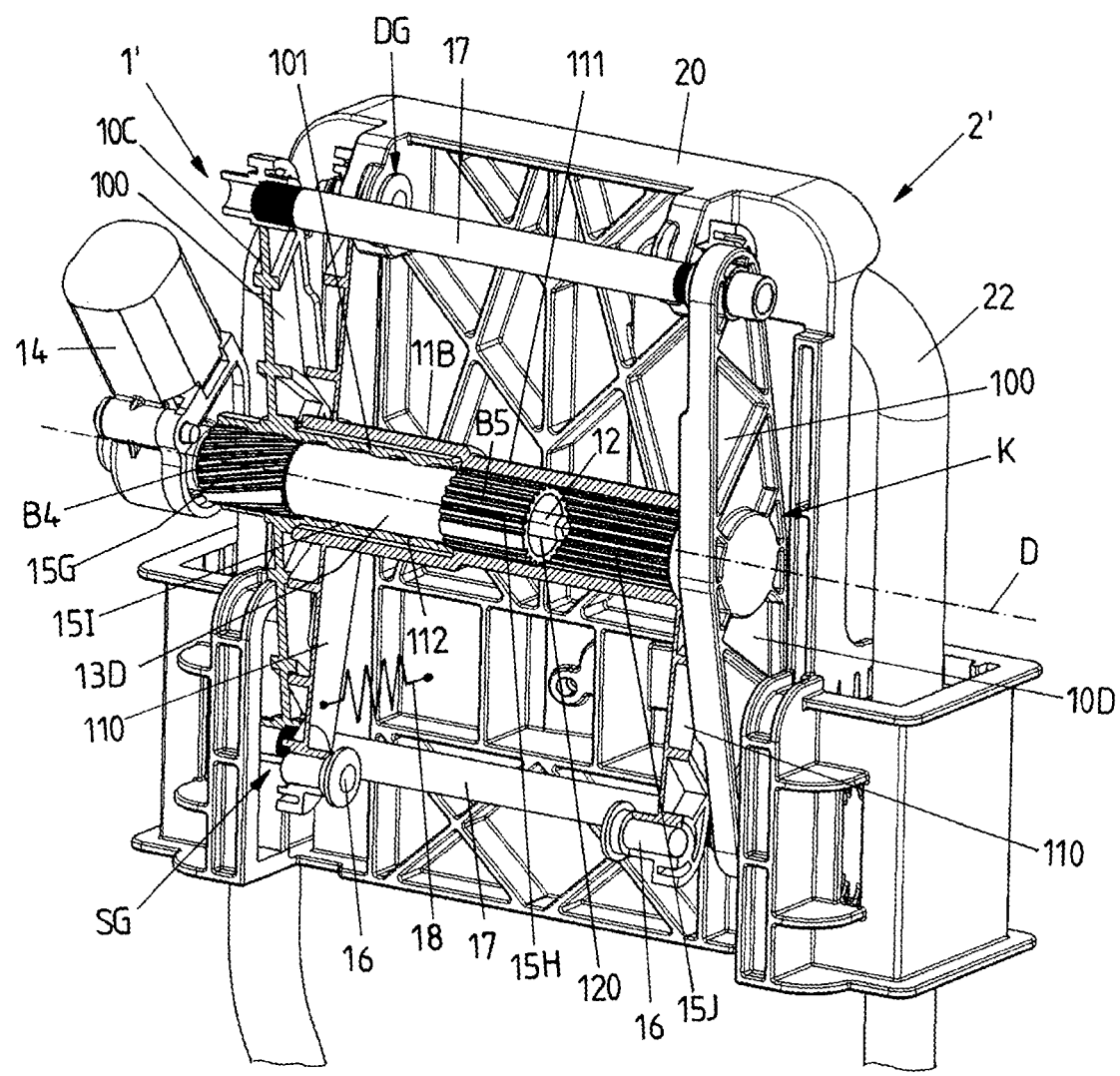
FIG. 9 shows a perspective view of a headrest with an adjustment device in a retracted position.

FIGS. 9 to 10B show a headrest 2' similar to headrest 2 as shown in FIGS. 1 to 5B and including an adjustment device 1'. The adjustment device 1' according to FIGS. 9 to 10B comprises, in contrast, only for one of the outer adjusting parts 10C, 10D drive contours 15G-15J.

Accordingly, it is provided that the drive element 13D is coupled with (only) two adjusting parts 10C, 11B via meshing drive contours 15G-15J, which describe at least one adjustment path B4, B5 for each of the two adjusting parts 10C, 11B, and the adjustment path B4 of one (outer) of the adjusting parts 10A has a twist with respect to the axis of rotation D and is different from the adjustment path B5 of the other (inner) of the adjusting parts 11B, so that movement of the drive element 13D along the axis of rotation D causes a relative movement between the adjusting parts 10A, 11B.

In general, the adjustment paths B1-B5 of at least two adjusting parts 10A-10D, 11A, 11B (especially in the form of teeth) can have unidirectional but different pitches. The drive contours 15A-15J of at least two adjusting parts 10A-10D, 11A, 11B (especially in the form of teeth) can have different diameters. Thus the spindle nut 13A-13D can be used directly as an adjustment stop in both directions.

The drive contours 15H, 15J for the inner adjusting part and the corresponding adjustment paths B5 are straight and parallel to the axis of rotation. The outer adjusting parts 10C, 10D are coupled via the base 10, the impact element 21 and the stiffening strut 17.

In the case of the adjustment device 1', a springing of the inner adjusting part 11B is provided, in the form of a return spring 18, which is attached on one side to the inner adjusting lever 11B and on the other side to the base 20.

Figure 11:
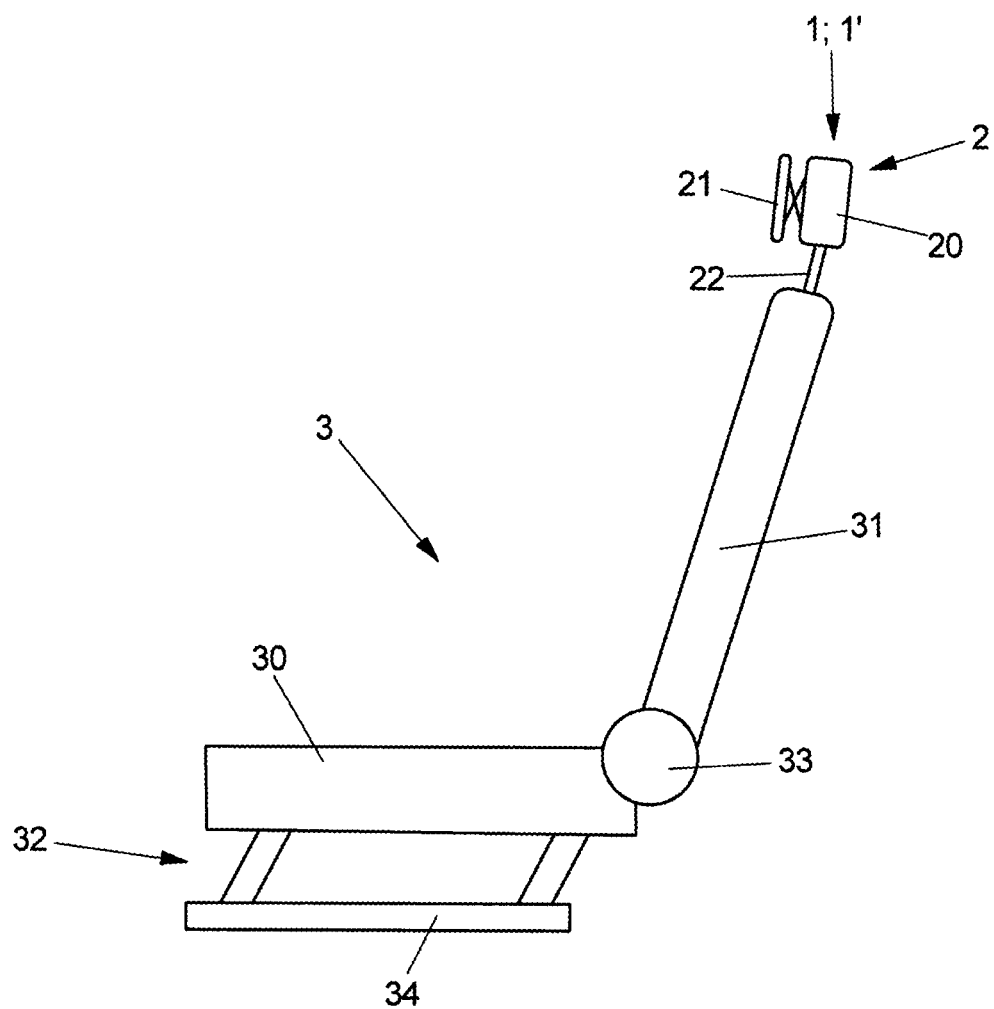
FIG. 11 shows a vehicle seat with a headrest.

A vehicle seat 3 of a vehicle shown schematically in FIG. 11 has a seat part 30, a backrest 31 and several adjustment devices.

The vehicle seat 3 comprises an optional height adjustment device 32, with which the seat part 30 (here, together with the backrest 31) is adjustable (at least) in a height axis relative to a vehicle floor of the vehicle in a state installed in the vehicle.

The backrest 31 can be adjusted to the seat part 30 by means of an optional arrangement of swivel fittings 33. By means of the arrangement of swivel fittings 33, the backrest 31 can be swivelled relative to the seat part 30 about a pivot axis in order to adjust the tilt position of the backrest 31 in relation to the seat part 30 or to bring the backrest 31 into a pre-swivelled, for example flat position, for example to increase storage space in the vehicle.

The vehicle seat 3 further comprises a longitudinal adjustment device 34 for adjusting the vehicle seat 3 in the direction of a longitudinal axis. By means of the longitudinal adjustment device 34, the seat part 30 together with the backrest 31 is adjustable along the longitudinal axis relative to the vehicle floor of the vehicle in a state installed in the vehicle. The longitudinal axis is perpendicular to the height axis. By means of the longitudinal adjustment device 34 the (remaining) vehicle seat 3 can be connected to the vehicle floor and is connected in the example shown.

Such a vehicle seat 3 may be designed as a front seat in a vehicle. However, such a vehicle seat 3 may also be used as a rear seat in a second or third row of seats in a vehicle.

Furthermore, the vehicle seat includes a headrest 2 as shown in FIG. 1-5B, alternatively a headrest 2' as shown in FIG. 9-10B. The impact element 21 is thus adjustable in the longitudinal direction relative to the base 20 by means of the adjustment device 1 (alternatively by means of the adjustment device 1').

Figure 12A:
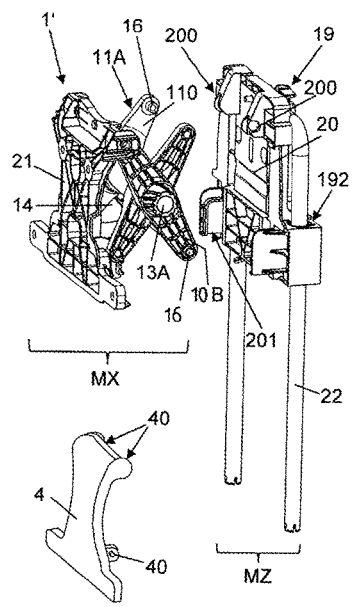
FIGS. 12A-12C show different steps of a method to assemble a headrest with a height-adjustment module and a depth-adjustment module.
Figure 12B:
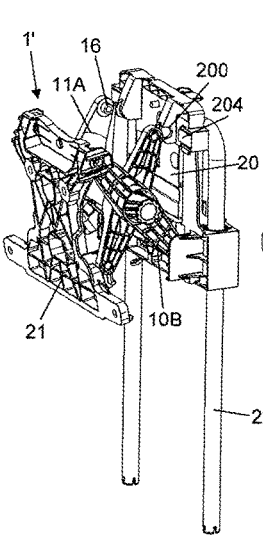
Figure 12C:
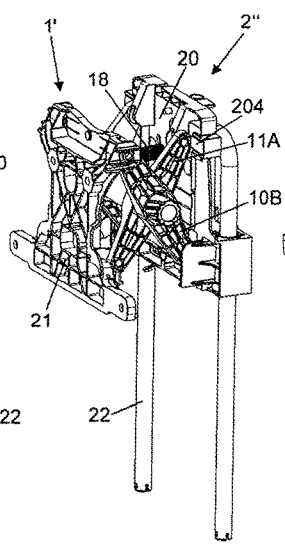

FIG. 12A to 12C show different steps in a method to assemble a headrest 2". The headrest 2" corresponds to the headrest 2 as shown in FIGS. 1 to 5B, with the difference that the base 20 of the headrest 2" of FIGS. 12A-12C is designed with mounting areas 201 in the form of open-ended slots allowing to slide in domes 16 of the scissor levers 100 of the outer adjusting parts 10A, 10B, and mounting areas 200 that allow to snap in the domes 16 of the scissor levers 110 of the inner adjusting part 11A. It is worth noting that the headrest 2 of FIGS. 1 to 5B could, as an option also be provided with such mounting areas 200, 201, as well as the headrest 2' of FIGS. 9 to 10B.

FIG. 12A shows a pre-assembled depth-adjustment module MX with a (double) scissor kinematics, and a pre-assembled height-adjustment module MY. Further, FIG. 12A shows a front pad 4, and the front pad 4 does not provide any depth-adjustment.

Together, the pre-assembled depth-adjustment module MX, the pre-assembled height-adjustment module MY and the front pad 4 form a construction set. The construction set allows to either mount the depth-adjustment module MX or the front pad 4 to the height-adjustment module MY. Thus, the same design of the height-adjustment module MY may be used both for use cases where depth-adjustment is required, and for use cases where depth-adjustment is not required.

The depth-adjustment module MX comprises the inner and outer adjusting parts 10A, 10B, 11A, the drive element 13A, the impact element 21 (which may have substantially the same shape as the front pad 4) as described above with reference to FIGS. 1 to 5B. The depth-adjustment module MX (optionally) also comprises the drive unit 14 or, alternatively, a manual drive. Further parts, such as a cushion and trim parts may also be pre-assembled. At longitudinal ends of the scissor levers 100, 110 facing away from the impact element 21, domes 16 (as one example of suitable mounting areas) are arranged.

To mount the depth-adjustment module MX on the height-adjustment module MZ, first the domes 16 of the outer adjusting parts 10A, 10B are sled into the mounting areas 201 of the base 20 being designed as slots. For this purpose, the slots have one closed end, and one open end. The closed end faces the other (snap-in) mounting areas 200 of the base 20, and the closed ends face away therefrom. Thus, said domes 16 are introduced into the slots from below.

A state where the domes 16 of the outer adjusting parts 10A, 10B are sled into the slot-shaped mounting areas 201 of the base 20 is shown in FIG. 12B. Next, the depth-adjustment module MX is rotated about the domes 16 in the slot-shaped mounting areas 201 so that the domes 16 of the inner adjusting part 11A approach the (upper) mounting areas 200. The upper mounting areas 200 each define a receptacle. The upper mounting areas 200 allow the domes 16 to snap in so as to be retained in the receptacles with a positive fit in a rotatable manner.

FIG. 12C shows the assembled state of the headrest 2". Therein, the domes 16 of the inner adjusting part 11A are snapped into the mounting areas 200 defining the receptacles. The headrest 2" is adjustable in depth along an x axis indicated in FIG. 13. When adjusting the depth, the outer adjusting parts 10A, 10B rotate relative to the inner adjusting part 11A, and the domes 16 of the outer adjusting parts 10A, 10B slide along the slot-shaped mounting areas 201 of the base 20.

FIG. 12C also shows the return spring 18 being mounted on the base 20 with one end and on the impact element 21 with the other end.

When a headrest shall be assembled that is not depth-adjustable, instead of the depth-adjustment module MX the front pad 4 may be mounted on the height-adjustment module MZ in the same manner as described with respect to the depth-adjustment module MX.

Figure 13:
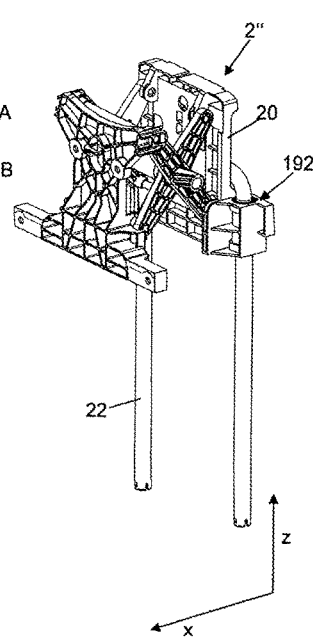
FIG. 13 shows an assembled headrest being height-adjustable and depth-adjustable.

FIG. 13 shows a different height (along a z axis perpendicular to the x axis) of the base 20 with respect to the headrest rod 22. For the height-adjustment, the headrest 2" is provided with a height-adjustment mechanism 19. It is worth noting that all other embodiments described herein may likewise be provided with such a height-adjustment mechanism 19.

The height-adjustment mechanism 19 comprises slide bearings 192 by means of which the base 20 is slideably mounted on the parallel sections of the headrest rod 22.

Figure 14A:
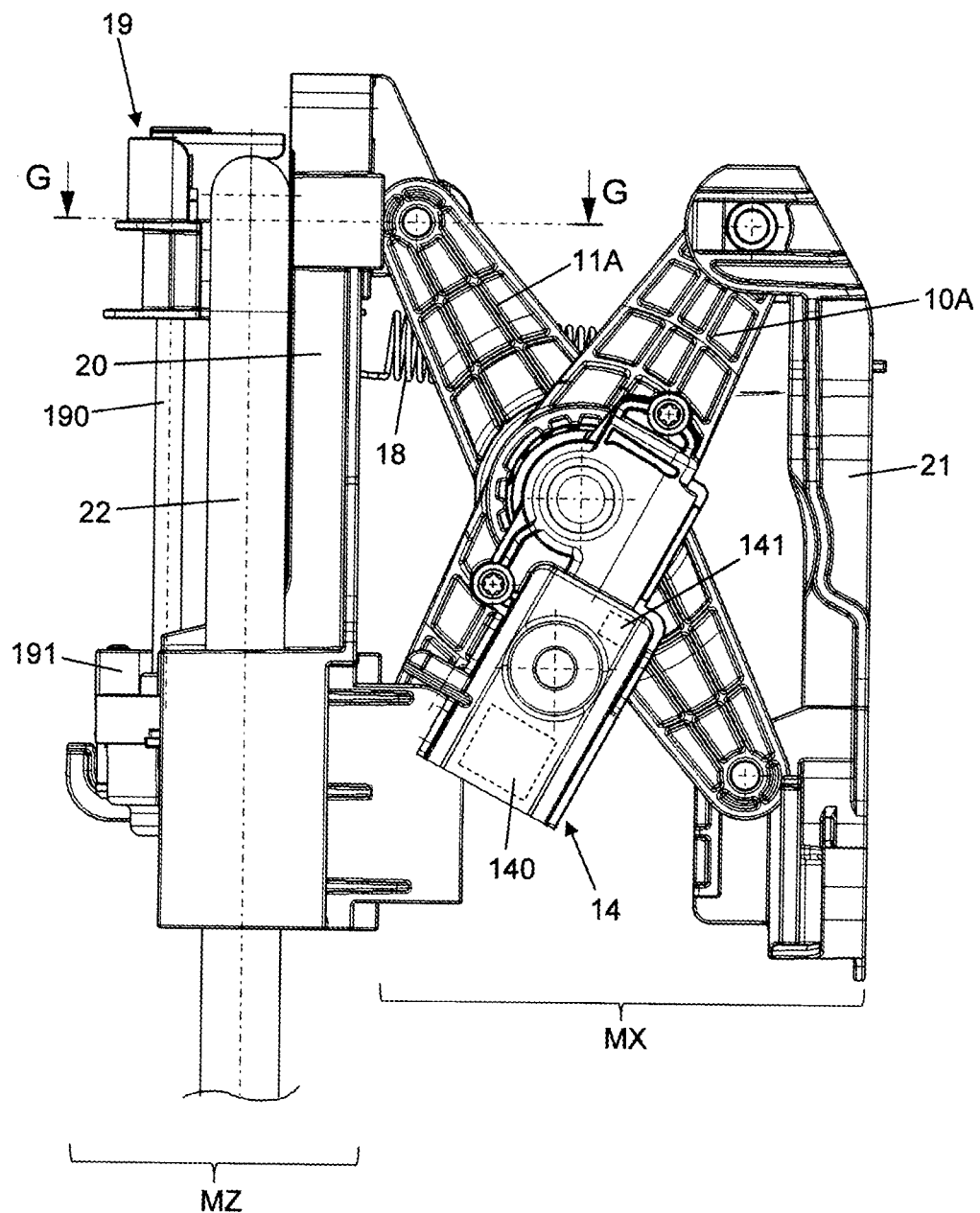
FIGS. 14A-14C show details of the attachment of the depth-adjustment module to the height-adjustment module according to FIGS. 12A-12C.
Figure 14B:
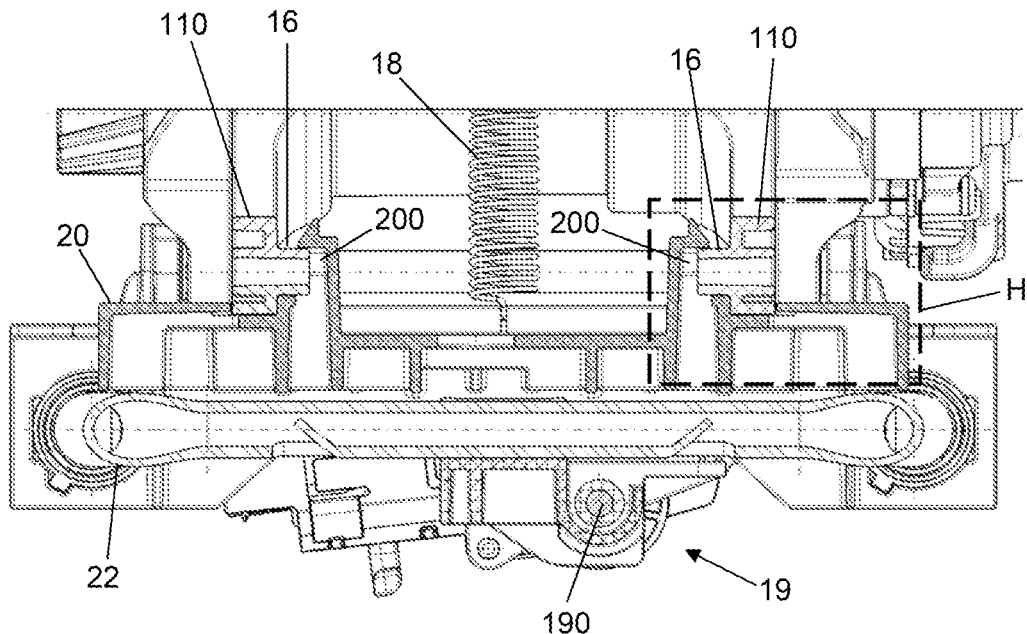

FIGS. 14A and 14B further show a spindle 190 and a drive unit 191 of the height-adjustment mechanism 19. The spindle 190 extends parallel to the parallel sections of the headrest rod 22 and parallel to the z axis. The drive unit 191 is mounted on the base 20, but could alternatively also be mounted on the headrest rod 22. In the present example, the drive unit 191 rotates a spindle nut rotatably mounted on the base 20 which travels along the spindle 190, the spindle being fixed with respect to the headrest rod 22. Alternatively, the drive unit 191 could rotate the spindle 190, and a spindle nut would be fixed with respect to the headrest rod 22.

Figure 14C:
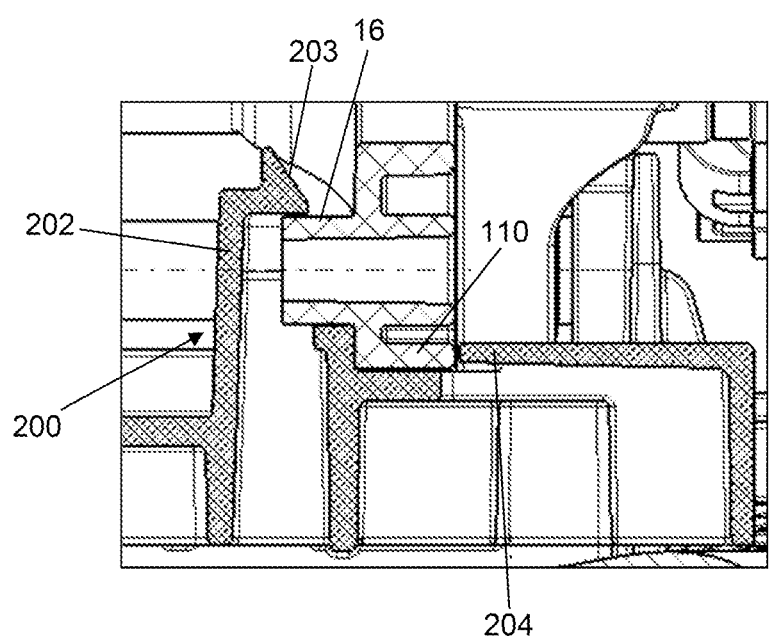

FIGS. 14B and 14C show further details of the upper mounting areas 200 of the base 20, and the domes 16 of the inner adjusting part 11A. Therein, FIG. 14C is an enlarged view of the box H indicated in FIG. 14B.

It can be seen that each mounting area 200 is provided with a latching element 202 positively locking the dome 16 in the receptacle of the mounting area 200. The latching element 202 is formed as a protrusion. The scissor lever 110 is resilient and may be elastically bent aside when the dome 16 is pushed into the receptacle. To simplify this connection, the latching element 202 has a lead-in chamfer 203 at its free end on which the dome 16 glides aside before snapping into the receptacle.

Further, the mounting area 200 comprises a securing element 204. The securing element 204 is formed on the base 20. The securing element 204 is resilient. When the dome 16 is pushed into the receptacle, the corresponding scissor lever 110 of the inner adjusting part 11A pushes against the securing element 204 and elastically bends it in the pushing direction. The mounting area 200 is designed such that when the dome 16 snaps (sideways, vertical to the pushing direction) into the receptacle at the latching element 202, the securing element 204 snaps back (opposite the pushing direction) to the side of the scissor lever 110 to secure the dome 16 in the receptacle. In the attached state, the latching element 202 and the securing element 204 retain the dome 16 inside the receptacle from two orthogonal directions.

As can be seen in FIGS. 12B and 12C, the securing element 204 may have the shape of a spring plate, e.g., having a free end and formed by two parallel slits. In FIG. 13 securing element 204 is omitted solely for simplicity.

FIGS. 15A-15C show different positions of the impact element 21 as one component with respect to the base 20 as another component of the headrest 2". Here, the headrest 2" of FIGS. 12A-14C is shown, but the following description may correspondingly apply to any one of the headrests 2; 2'; 2" described above.

The adjustment device 1' allows an adjustment of the impact element 21 relative to the base 20 along the x axis within a kinematical range RK which is delimited by the retracted position PR shown in FIG. 15A, and the extended position PE shown in FIG. 15C.

The retracted position PR is defined by an end stop. The end stop is defined by a stop portion 104 at an end of a scissor lever 100 of one of the outer adjusting parts 10A, 10B, and a stop portion 114 at an end of one of the scissor levers 110 of the inner adjusting part 11A by making contact with one another. A corresponding end stop is (optionally) provided at the other pair of scissor levers 100, 110. Further, another end stop is (optionally) provided at the other end of the scissor lever(s) 100, 110, see FIGS. 16A and 16B.

Since the end stops are provided at the ends of the scissor levers 100, 110, a relatively stiff stop is achieved. However, when driving a vehicle with the headrest 2, the stop portions 104, 114 may rattle. To avoid such rattling, one might consider interposing a damper such as a rubber or foam. Such a damper, however, would increase the thickness of the headrest 2". Herein, a different solution is provided that does not need any additional damper component which would add weight and may have a limited lifetime, and at the same time the solution described herein allows a very slim package in the rearmost adjustable position.

The drive unit 14 comprises a motor 140 and a control unit 141 (see, e.g., FIG. 14A), but it is worth noting that the control unit 141 may also be located elsewhere. The control unit 141 controls operation of the motor 140. The control unit 141 is adapted to control the motor 140 such that the scissor levers 100, 101 and the impact element 21 are not adjusted in a disallowed range RD. The disallowed range RD extends between the retracted position PR and a rear adjustment position PA, see FIG. 15B. Before entering the disallowed range RD, the control unit 141 stops operation of the motor 140 at the rear adjustment position PA. Alternatively or in addition, the control unit 141 is adapted to continue operation of the motor 140 (e.g., irrespective of an input signal indicating to stop) as long as the scissor levers 100, 101 and the impact element 21 are within the disallowed range RD.

Between the rear adjustment position PA and the extended position PE, the scissor levers 100, 101 and impact element 21 are adjustable by means of the drive unit 14. In the present example the adjustment is stepless. The rear adjustment position PA and the extended position PE define an allowed, adjustable range RA. That is, the control unit 141 allows a stationary adjustment within the adjustable range RA, prevents a stationary adjustment in the disallowed range RD, and allows a stationary adjustment in the retracted position. As an example, starting from the retracted position PR, and receiving a signal to displace the scissor levers 100, 101 and the impact element 21 in the direction of the extended position PE, the control unit 141 may be adapted to at least displace the scissor levers 100, 101 and the impact element 21 until entering the adjustable range. Alternatively or in addition, starting from the adjustable range RA in the direction of the retracted position PR, when entering the disallowed range RD, the control unit 141 may be adapted to at least displace the scissor levers 100, 101 and the impact element 21 until assuming the retracted position PR. Alternatively or in addition, the control unit 141 may be adapted to displace the scissor levers 100, 101 and the impact element 21 to the closer one of the retracted position PR and the rear adjustment position PA when receiving a signal to stop.

The adjustable range RA is smaller than the kinematical range RK. The kinematical range RK equals the sum of the adjustable range RA and the disallowed range RD. Hence, the control unit 141 defines a virtual end stop, and the stop portions 104, 114 define a mechanical end stop (by mechanically contacting one another). By means of the control unit 141 it is made sure that a gap of, e.g., several mm, e.g., 3 mm (or at least 3 mm), between the stop portions 104, 114 defining the end stop is maintained to effectively avoid any rattling. The disallowed range RD may be preconfigured or configurable, and it may be defined by a number of motor revolutions. Optionally, a calibration may be performed by the control unit 141 and the motor 140 is controlled to retract until reaching the mechanical end stop and then extend by a (preconfigured) number of revolutions to assume the rear adjustment position PA.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMERALS

1; 1' adjustment device
10A-10D outer adjusting part
100 scissor lever
101, 102 cylinder section
103 axis
104 stop portion
11A, 11B inner adjusting part
110 scissor lever
111 cross member
112 bushing
113 bushing
14 stop portion
2 spindle
120 external thread
13A-13D spindle nut (drive element)
130 internal thread
131A, 131B input part
132A-132CA output part
133 latching hook
134 latching edge
135 counterstop
136 stop
37A; 137B, 138 end stop
14 drive unit
140 motor
141 control unit 15A-15J drive contour
16 mounting area (dome)
17 stiffening strut
18 reset spring
19 height-adjustment mechanism
90 spindle
91 drive unit
192 slide bearing
2; 2'; 2" headrest
20 base
200 mounting area (receptacle)
201 mounting area (slot)
202 latching element
203 lead-in chamfer
204 securing element
21 impact element
22 headrest rod
3 vehicle seat
30 seat part
31 backrest
32 height adjustment device
33 swivel fitting
34 length adjustment device
4 front pad
40 mounting area
B1-B5 adjustment path
A receptacle
D axis of rotation
DG swivel joint
DS sliding swivel joint
K crossing point
MX depth-adjustment module
MZ height-adjustment module
PA rear adjustment position
PE extended position
PR retracted position
RA adjustable range
RD disallowed range
RK kinematical range
X longitudinal direction While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A headrest for use in a vehicle seat, the headrest comprising:
    an adjustment device including,
        at least two adjusting parts including a first adjustment part and a second adjustment part,
        a drive element configured to move along an axis, and
        a number of meshed drive contours coupling the at least two adjusting parts to the drive element and defining an adjustment path for each of the at least two adjusting parts
    wherein the first adjustment part is configured to move along a first adjustment path and the second adjustment part is configured to move along a second adjustment path,
    wherein at least one of the first and second adjustment paths is twisted with respect to the axis and the first adjustment path is different than the second adjustment path so that an axial movement of the drive element along the axis causes a relative rotation between at least the first and second adjusting parts.

2. The headrest of claim 1, wherein the at least two adjusting parts includes a third adjusting part.

3. The headrest of claim 1, further comprising:
a spindle extending along and configured to rotate about the axis, wherein the drive element includes an internal thread configured to engage the spindle.

4. The headrest of claim 1, wherein each of adjustment paths of the at least two adjusting parts rotate in a rotational direction and either have a twist extending in a direction common to the rotational direction of the adjustment path or extend parallel to the axis.

5. The headrest of claim 1, wherein the at least two adjusting parts includes two outer adjusting parts and an inner adjusting part arranged between the two outer adjusting parts, wherein adjustment paths of the two outer adjusting parts include a twist and an adjustment path of the inner adjusting part extends parallel to the axis, or the adjustment paths of the two outer adjusting parts extend parallel to the axis and the adjustment path of the inner adjusting part includes a twist.

6. The headrest of claim 5, wherein the twist of each of the adjustment paths of the two outer adjusting parts have a common pitch.

7. The headrest of claim 1, wherein each adjusting part of the at least two adjusting parts forms at least one scissor lever configured to rotate relative to one another about the axis at a crossing point.

8. The headrest of claim 7, wherein the adjustment device includes a component forming a base and including mounting areas, wherein mounting areas of the scissor levers are configured to be mounted the mounting areas of the base.

9. The headrest of claim 8, wherein at least some of the at least two adjusting parts form a preassembled x-adjustment module configured to be mounted to the mounting areas of the base.

10. The headrest of claim 8, wherein the mounting areas of the at least one scissor lever are arranged at longitudinal ends of the at least one scissor lever.

11. The headrest of claim 8, wherein at least one of the mounting areas of the base includes a latching element provided with a lead-in chamfer.

12. The headrest of claim 8, wherein the base is configured to be mounted to a headrest rod so that the base displaceable relative to the headrest rod.

13. The headrest of claim 1, wherein the at least two adjusting parts collectively form a tubular receptacle, and the drive element is movable along the axis and within the tubular receptacle.

14. The headrest of claim 1, wherein two components are coupled to the at least two adjusting parts, the two components are movable relative to one another by a relative movement between the at least two adjusting parts.

15. The headrest of claim 14, wherein the adjustment device includes at least one return spring configured to bias the two components in a direction towards one another.

16. The headrest of claim 14, wherein the at least two adjusting parts are configured to move one of the two components with respect to the other of the two components between a retracted position and an extended position.

17. The headrest of claim 16, wherein the adjustment device includes a drive unit provided with a motor configured to actuate to affect a movement of one of the two components with respect to the other of the two components.

18. The headrest of claim 17, wherein the retracted position and the extended position define a kinematical range, wherein the adjustment device includes a control unit configured to control operation of the motor such that a stationary adjustment of one of the two components with respect to the other of the two components is restricted to the retracted position and an adjustable range, the adjustable range smaller than the kinematical range.

19. The headrest of claim 16, wherein an end stop defines the retracted position or the extended position.

20. The headrest of claim 7, wherein the at least one scissor lever includes stop portions, and the end stop is defined by the stop portions.

21. The headrest of claim 20, wherein the stop portions are arranged at longitudinal ends of the at least one scissor lever.

22. The headrest of claim 1, wherein the meshed drive contours are formed by a toothing.

23. The headrest of claim 1, wherein a drive contour of the number of meshed drive contours are formed on each of the at least two adjusting parts, and the drive element includes another drive contour of the number of drive contours configured to engage at least one the drive contour of the number of meshed drive contours formed the at least two adjusting parts.

24. The headrest of claim 23, wherein drive contours of the number of meshed drive contours formed on the drive element are arranged side by side along the axis.

25. The headrest of claim 1, wherein the drive element includes an input part configured to be connected to an output part in a rotationally fixed manner.

26. The headrest of claim 25, wherein the input part and the output part are fixedly connected to each other by a number of scraper ribs.

27. The headrest of claim 25, wherein the input part is connected positively to the output part.

28. The headrest of claim 25, wherein the input part has a first coefficient of sliding friction and the output part has a second coefficient of sliding friction, wherein the first coefficient of sliding friction is less than the second coefficient of sliding friction.

29. The headrest of claim 25, wherein the output part has a first strength and the input part has a second strength, wherein the first strength is greater than the second strength.

30. The headrest of claim 25, wherein the output part and the input part each have a maximum outer diameter measured perpendicular to the axis, wherein the maximum outer diameter of the output part is the same as the maximum outer diameter of the input part.

* * * * *